(12) United States Patent
Facchinello et al.

(10) Patent No.: US 10,144,276 B2
(45) Date of Patent: *Dec. 4, 2018

(54) TONNEAU COVER SYSTEM AND RATCHET CLAMP

(71) Applicant: Extang Corporation, Ann Arbor, MI (US)

(72) Inventors: Jerome J. Facchinello, Grand Blanc, MI (US); Charles A. Fabros, Downers Grove, IL (US)

(73) Assignee: Extang Corporation, Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/470,372

(22) Filed: Mar. 27, 2017

(65) Prior Publication Data

US 2017/0197498 A1    Jul. 13, 2017

Related U.S. Application Data

(63) Continuation-in-part of application No. 14/875,006, filed on Oct. 5, 2015, now Pat. No. 9,630,479.
(Continued)

(51) Int. Cl.
  *B60J 7/19* (2006.01)
  *B60J 7/10* (2006.01)
  (Continued)

(52) U.S. Cl.
  CPC ............... *B60J 7/198* (2013.01); *B60J 7/106* (2013.01); *B60J 7/141* (2013.01); *F16B 2/185* (2013.01); *B60J 7/102* (2013.01)

(58) Field of Classification Search
  CPC ... B60J 7/19; B60J 7/198; F16G 11/10; F16G 11/105; B62B 5/00; B62B 5/02;
  (Continued)

(56) References Cited

U.S. PATENT DOCUMENTS

| | | | | |
|---|---|---|---|---|
| 1,222,549 A | * | 4/1917 | Lark | E05B 65/006 292/256.75 |
| 1,702,506 A | * | 2/1929 | Hennicke | E05B 83/243 292/114 |

(Continued)

*Primary Examiner* — Hilary L Gutman
(74) *Attorney, Agent, or Firm* — Harness, Dickey & Pierce, P.L.C.

(57) ABSTRACT

A tonneau cover system clamp can include first and second clamp members with first and second clamping surfaces, respectively. The second clamp member can be slidably coupled to an elongate member relative to the first clamp member. A locking mechanism can be movable to engage the elongate member to prevent lateral translation of the second clamping surface relative to the first clamping surface in response to the first and the second clamp members being in the locked position. The locking mechanism can be movable to release the elongate member to allow lateral translation of the second clamping surface relative to the first clamping surface in response to the first and the second clamp members being in the unlocked position. A biasing member can apply a biasing force biasing the first clamp member and the second clamp member toward the proximal end of the elongate member.

18 Claims, 14 Drawing Sheets

Related U.S. Application Data

(60) Provisional application No. 62/323,052, filed on Apr. 15, 2016, provisional application No. 62/060,637, filed on Oct. 7, 2014.

(51) Int. Cl.
  *B60J 7/14* (2006.01)
  *F16B 2/18* (2006.01)

(58) Field of Classification Search
  CPC .. B62B 5/06; B62B 5/068; B62B 5/08; B62B 5/085; B62B 5/10; B62B 5/102; B62B 5/104; B62B 5/127; B62B 5/147; B62B 9/04; B65D 45/00; B65D 45/04; B65D 45/10; B65D 45/16; B65D 45/24; B65D 45/322; E05C 19/18; E05C 19/182; E05C 19/184; E05C 19/186; E05C 19/188
  USPC .................................... 296/100.04
  See application file for complete search history.

(56) References Cited

U.S. PATENT DOCUMENTS

| | | | |
|---|---|---|---|
| 2,445,188 A | 7/1948 | Sasgen | |
| 3,327,999 A * | 6/1967 | Mitchell | E06B 9/324 24/134 R |
| 3,758,922 A * | 9/1973 | Field | B63B 21/08 114/218 |
| 3,795,218 A * | 3/1974 | Merry | B63B 21/08 114/218 |
| 3,998,167 A | 12/1976 | Van Gompel | |
| 4,185,811 A * | 1/1980 | Long | B25B 5/06 269/216 |
| 4,195,587 A * | 4/1980 | Voss | B63B 21/08 114/101 |
| 4,278,042 A * | 7/1981 | Lindquist | B63B 21/08 114/218 |
| 4,340,997 A * | 7/1982 | Voss | B63B 21/08 114/218 |
| 4,582,307 A | 4/1986 | Wang | |
| 4,766,835 A * | 8/1988 | Randall | F16G 11/106 114/218 |
| 5,083,350 A * | 1/1992 | Sandreid | F16G 11/101 24/134 N |
| 5,460,423 A | 10/1995 | Kersting et al. | |
| 5,531,297 A * | 7/1996 | Pipan | B66D 5/16 188/65.1 |
| 5,540,475 A | 7/1996 | Kersting et al. | |
| 5,655,808 A | 8/1997 | Wheatley | |
| 5,979,840 A | 11/1999 | Hollister | |
| 6,073,979 A * | 6/2000 | Nawalaniec | B07B 1/46 209/372 |
| 6,957,795 B1 * | 10/2005 | Hsieh | F16B 2/12 248/231.51 |
| 7,188,888 B2 * | 3/2007 | Wheatley | B60J 7/104 292/256.73 |
| 7,258,387 B2 | 8/2007 | Weldy | |
| 7,556,229 B2 | 7/2009 | Elliott | |
| 7,628,442 B1 * | 12/2009 | Spencer | B60J 7/104 24/455 |
| 7,823,957 B2 | 11/2010 | Williamson | |
| 8,167,259 B2 | 5/2012 | Spang, Jr. | |
| 8,500,379 B2 * | 8/2013 | Harrigan | B60P 7/0823 410/98 |
| 8,807,625 B2 | 8/2014 | Garska | |
| 8,960,764 B2 * | 2/2015 | Spencer | B60J 7/104 292/256 |
| 9,487,071 B1 * | 11/2016 | Yue | B60J 7/141 |
| 9,533,555 B2 * | 1/2017 | Facchinello | B60J 7/106 |
| 9,630,479 B2 * | 4/2017 | Facchinello | B60J 7/106 |
| 2006/0267370 A1 * | 11/2006 | Wheatley | B60J 7/104 296/100.15 |
| 2013/0015678 A1 * | 1/2013 | Williamson | B60J 7/1607 296/100.09 |
| 2014/0042754 A1 | 2/2014 | Spencer | |
| 2015/0130212 A1 | 5/2015 | Spencer | |
| 2016/0096423 A1 * | 4/2016 | Facchinello | B60J 7/106 292/256 |
| 2017/0066311 A1 * | 3/2017 | Facchinello | B60J 7/198 |
| 2018/0009298 A1 * | 1/2018 | Kozlowski | B60J 7/198 |

\* cited by examiner

TONNEAU COVER SYSTEM AND RATCHET CLAMP

CROSS-REFERENCE TO RELATED APPLICATIONS

This application is a continuation-in-part of U.S. patent application Ser. No. 14/875,006 filed on Oct. 5, 2015, which claims the benefit of U.S. Provisional Application No. 62/060,637, filed on Oct. 7, 2014. This application claims the benefit of U.S. Provisional Application No. 62/323,052, filed on Apr. 15, 2016. The entirety of each of the above applications is incorporated herein by reference.

FIELD

The present disclosure relates to tonneau covers for vehicles. More particularly, the present disclosure relates to a clamp system for use in a tonneau cover system.

BACKGROUND

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching or clamp system for coupling the frame network to the pickup truck and a means for stowing the clamp system, and a hinge system for hingedly coupling adjacent sections of the foldable tonneau cover. However, the known prior art fails to maximize the ease and effectiveness of foldable tonneau covers and, thus, many foldable tonneau covers suffer from numerous disadvantages.

By way of example, existing clamp systems generally employ an over-center cam lock arrangement, wing nut clamp arrangement, and/or spring biased clamp arrangement to fasten the tonneau cover in place relative to the pickup truck. The clamps typically hook onto the downwardly projecting (metal) flange of the truck bed. Such clamps, in the case of the cam lock arrangement, are adjustable by rotating a threaded cam pivot to permit attachment of the clamps to pickup trucks with differing length downwardly projecting flanges. The other clamping systems can use threaded portions or other telescoping type mechanisms to provide a length adjustment feature.

However, these clamping systems lead to various problems or failures when used with more recent pickup truck bed designs produced by original equipment manufacturers (OEM). For instance, many of the newer sidewall flanges of pickup truck beds can become deformed under the extreme load that can be exerted by clamping systems. In fact, several new vehicles being designed are contemplating changes to the flange material or reducing the flange thickness. The result is a less structural flange which could be distorted when using typical tonneau clamp designs clamped to such downwardly extending flanges of the truck bed box. Consequently, as a conventional tonneau cover clamp is tightened in place, a user can exert sufficient force that causes the sidewall flange of the pickup truck bed to become permanently deformed.

Accordingly, there exists a need in the relevant art to provide a tonneau cover system capable of overcoming the disadvantages of the prior art. Additionally, there exists a need to provide sufficient retention capability to retain the tonneau cover on the pickup truck bed, without causing permanent deformation.

SUMMARY

This section provides a general summary of the disclosure, and is not a comprehensive disclosure of its full scope or all of its features.

In accordance with one aspect of the present disclosure, a tonneau cover system for a cargo box comprising a downwardly extending flange is provided. The system can include a tonneau cover for covering the cargo box and a clamp to secure the tonneau cover to the cargo box. The clamp can include an elongate member having a proximal end pivotably coupled to the tonneau cover. A first clamp member can have a first clamping surface. A second clamp member can be slidably coupled to the elongate member and can have a second clamping surface. The second clamp member can be slidable along the elongate member relative to the first clamp member between a locked position and an unlocked position. A locking mechanism can be coupled to the first clamp member. The locking mechanism can be movable to engage the elongate member to prevent lateral translation of the second clamping surface relative to the first clamping surface in response to the first and the second clamp members being in the locked position. The locking mechanism can be movable to release the elongate member to allow lateral translation of the second clamping surface relative to the first clamping surface in response to the first and the second clamp members being in the unlocked position. A biasing member can apply a biasing force biasing the first clamp member and the second clamp member toward the proximal end of the elongate member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
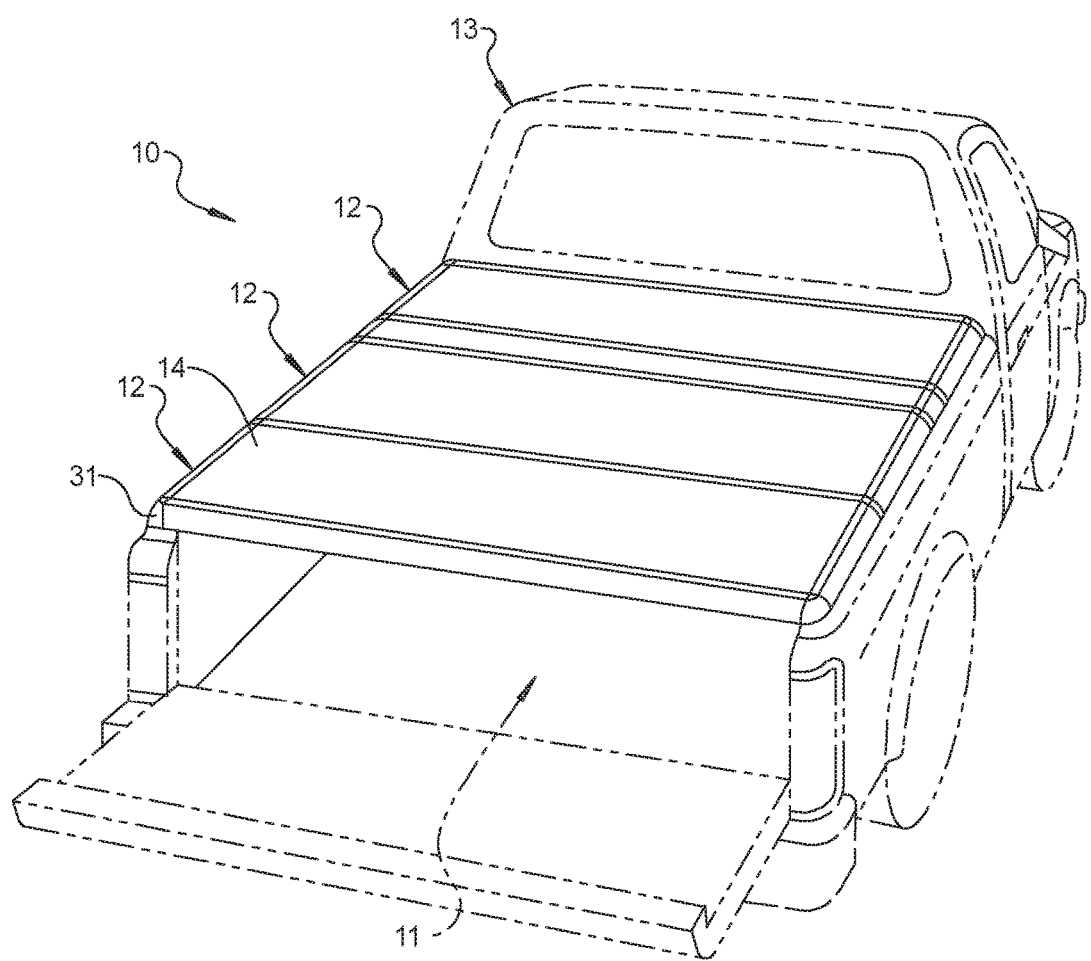
FIG. 1 is a perspective view of one exemplary embodiment of a tonneau cover system with a ratchet clamp in accordance with the present disclosure.
Figure 2:
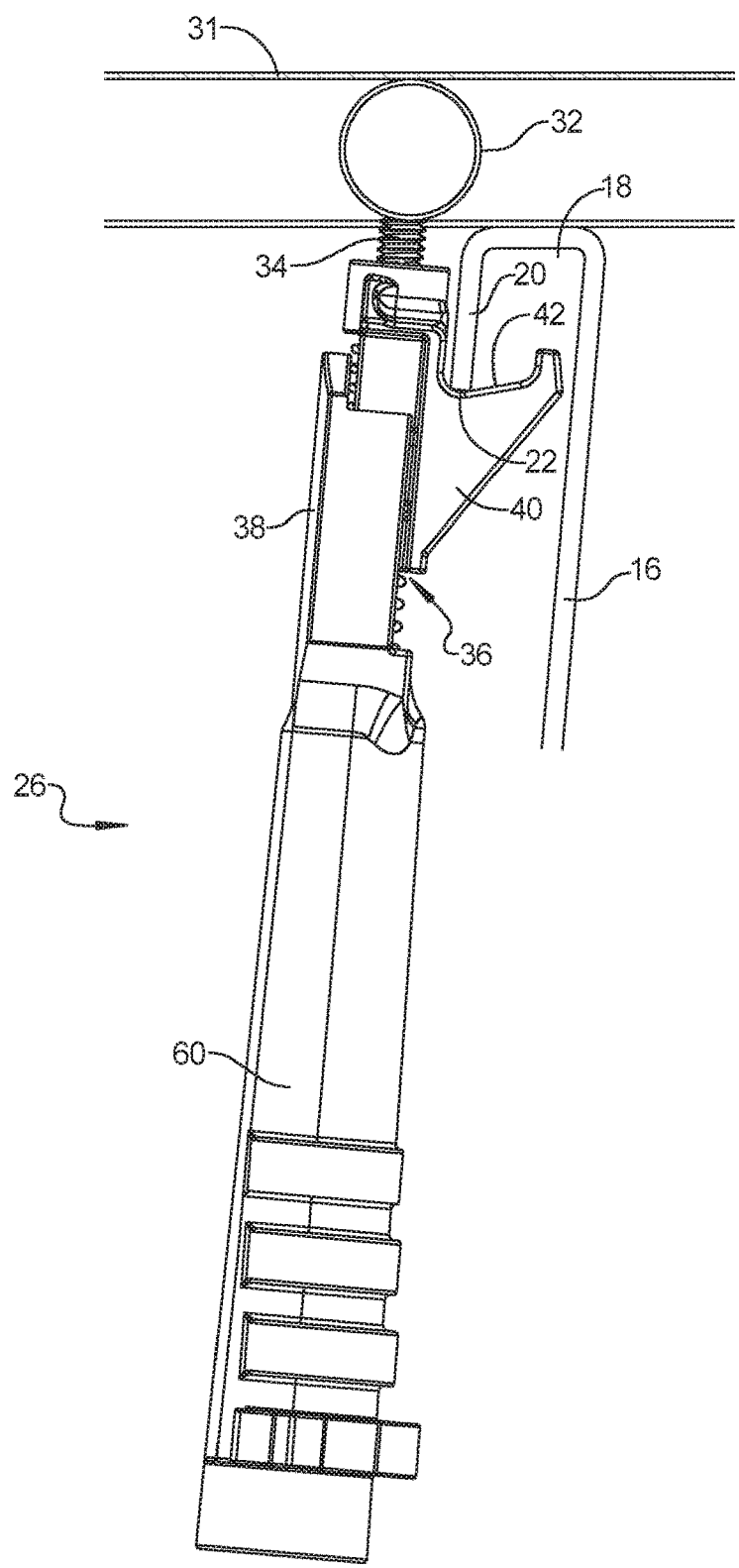
FIG. 2 is a side plan view of one exemplary embodiment of a ratchet clamp for the tonneau cover system of FIG. 1 in a clamped position, with a partial cross-sectional view of a cargo box.
Figure 3:
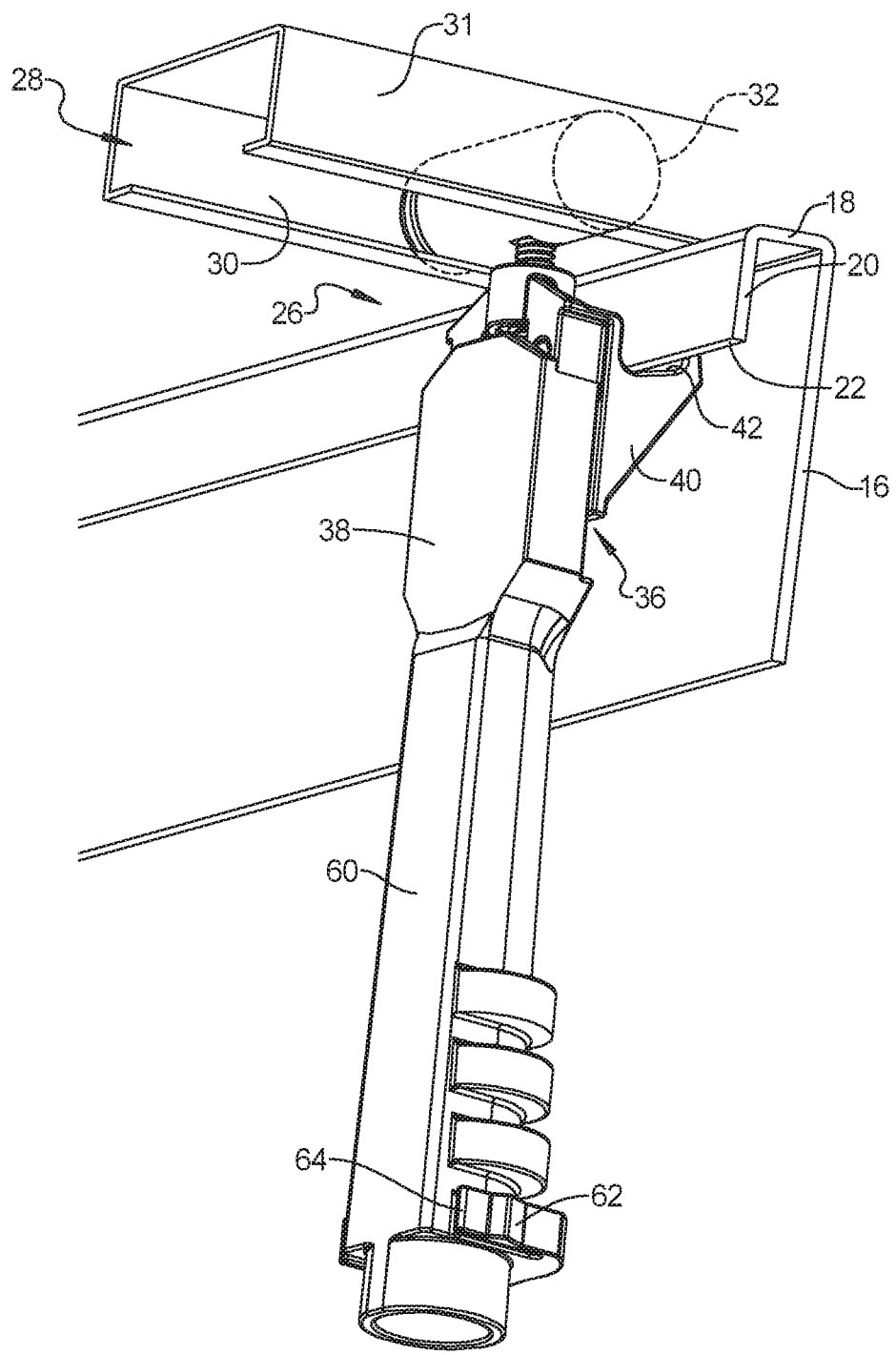
FIG. 3 is a partial perspective view of components of the tonneau cover system with the ratchet clamp of FIG. 2 in a clamped position, with a portion of the cargo box.

Example embodiments will now be described more fully with reference to the accompanying drawings.

FIGS. 1-6 illustrate one exemplary tonneau cover system 10 for covering a truck bed or cargo box 11 in accordance with the present disclosure. In some cases, the truck bed or cargo box 11 can be part of a pickup truck 13 as shown. The cargo box 11 includes a frame that can have an outer wall 16, a ledge 18 extending inboard from the outer wall 16 and a flange 20 extending downwardly from the ledge 18 and spaced inboard from the outer wall 16. The flange 20 can include a lower, or downwardly disposed or facing distal edge 22.

In some embodiments, the tonneau cover 10 can include a plurality of sections 12 foldable between a deployed arrangement covering the truck bed 11 and a folded arrangement wherein the sections 12 are stacked, allowing access to the truck bed 11. In some embodiments, each section 12 of the tonneau cover system 10 can comprise a plurality of frame and/or bow members 31 that together form a rectangular frame supporting a fabric, textile or other flexible sheet material 14 spanning the rectangular frame 31. In some embodiments, each of the plurality of tonneau sections 12 can alternatively comprise a generally rigid panel as the spanning material 14, and which can optionally include frame members 31 around the periphery of the rigid panel 14 that can similarly form the rectangular frame 31. Other tonneau cover configurations are, of course, possible.

The tonneau cover system 10 can include a ratchet clamp 26 pivotably coupled to one of the frame members 31. For example, the frame member 31 can comprise an extruded metal rail having a C-shaped cross-section defining a longitudinal internal channel 28 with a longitudinally extending central opening 30. A barrel member 32 can be rotatably and slidably retained within the channel 28. The clamp 26 can include an elongate member that can be a rod 34 and that can be coupled to a pivotable coupling that can be the barrel member 32. The rod 34 can extend out of the channel 28 through the opening 30 to pivotably couple the clamp 26 to the frame member 31.

The ratchet clamp 26 can include a housing 36 slidably mounted on the rod 34. The housing 36 can be formed of a first housing portion 38 and a second housing portion 40 movable along the central longitudinal axis 33 of the rod 34 relative to each other between a locked position and an unlocked position. The second housing portion 40 can include a channel 42 positioned to receive the downwardly disposed distal edge 22.

Figure 4:
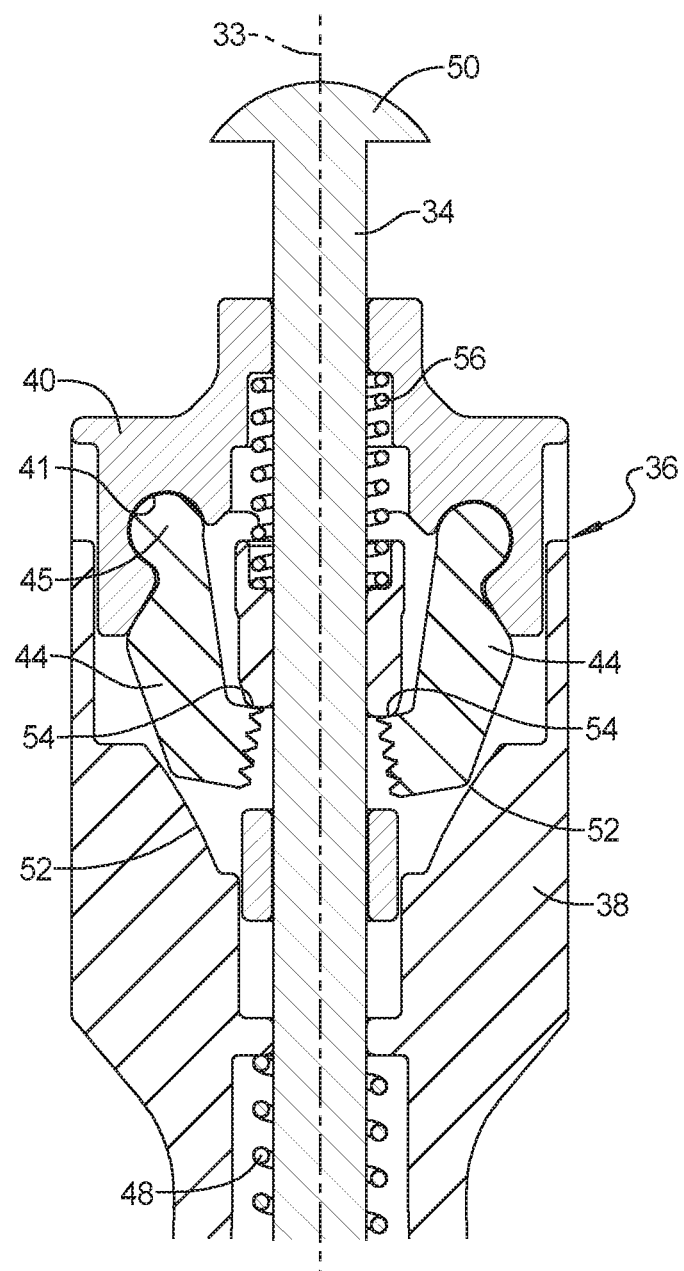
FIG. 4 is an enlarged partial cross-sectional view showing various components of the ratchet clamp of FIG. 2 in the unclamped position.
Figure 5:
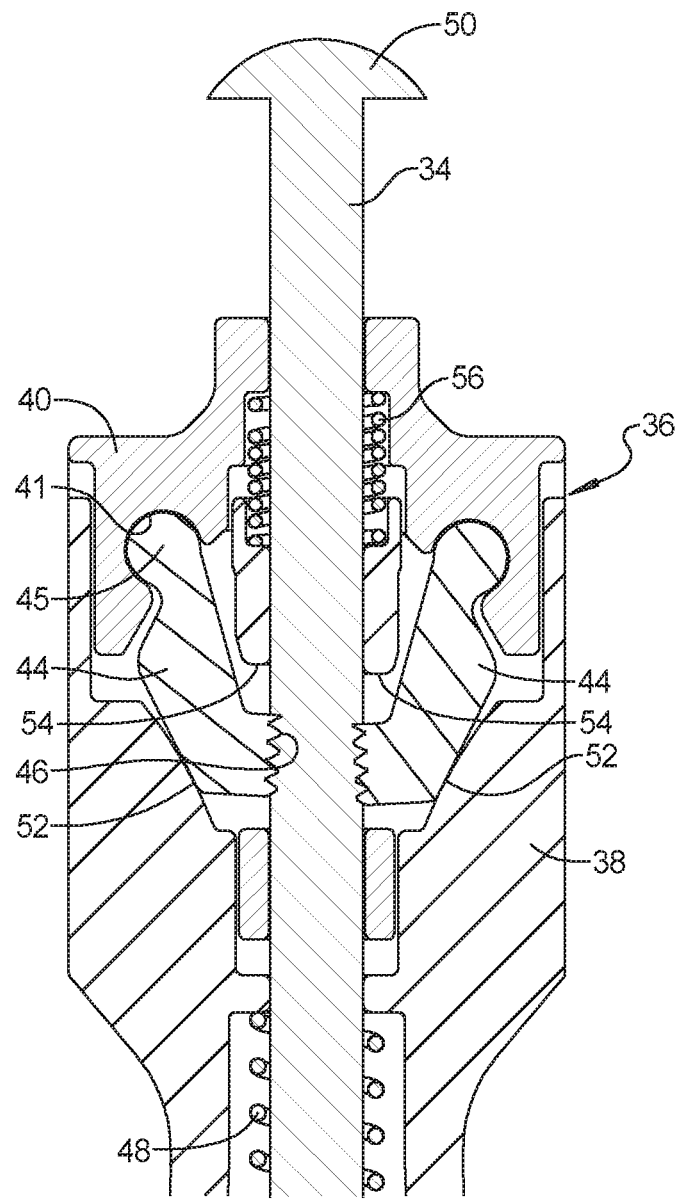
FIG. 5 is an enlarged partial cross-sectional view showing various components of the ratchet clamp of FIG. 2 in the clamped position.
Figure 6:
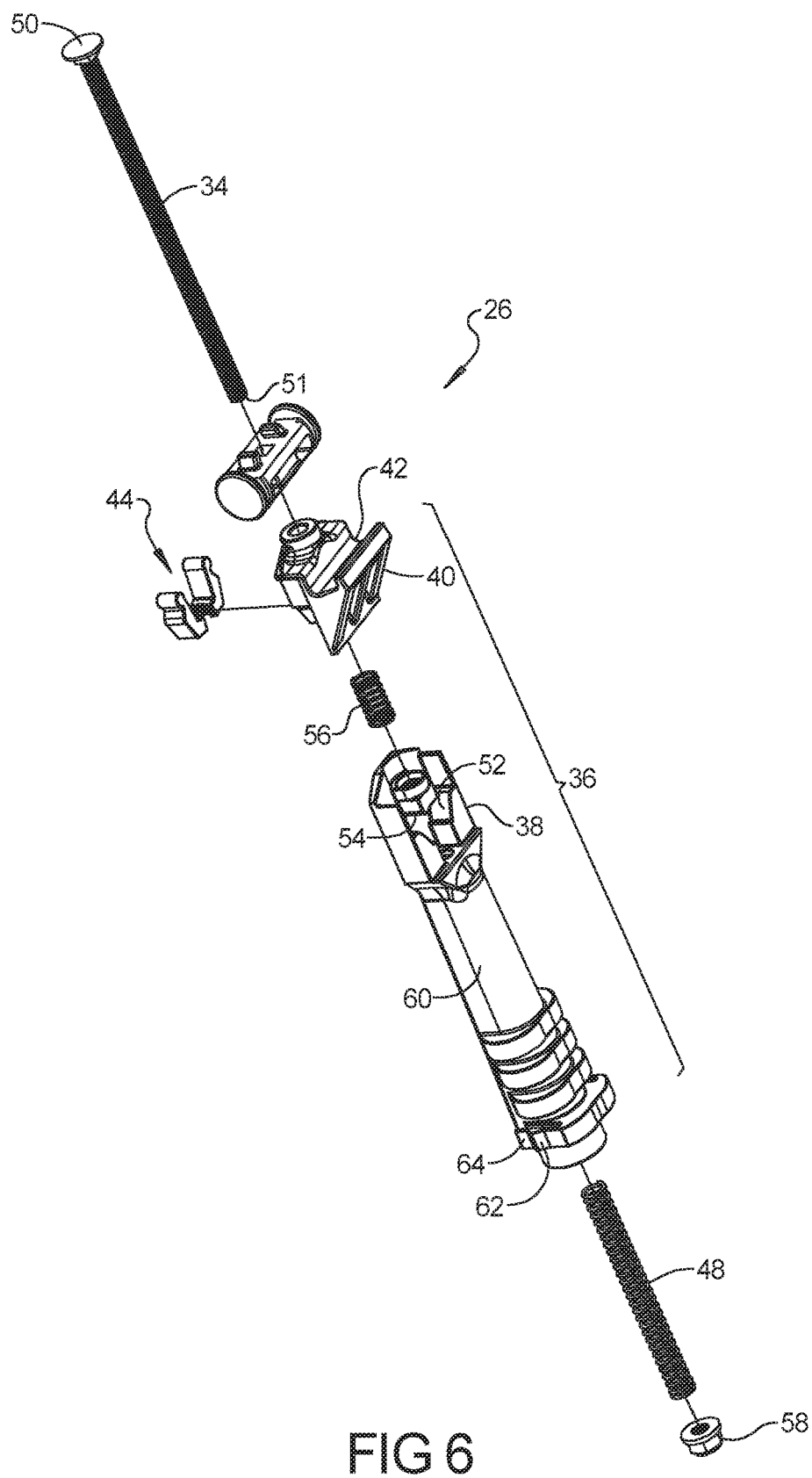
FIG. 6 is an exploded perspective view of the ratchet clamp of FIG. 2.
Figure 7:
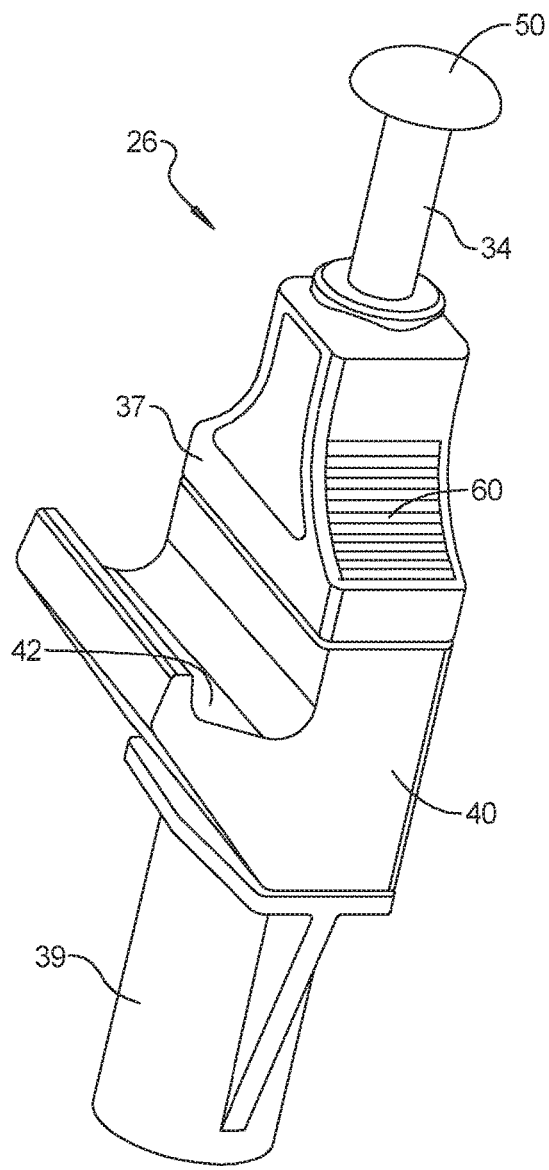
FIG. 7 is a perspective view of another exemplary embodiment of a ratchet clamp for the tonneau cover system of FIG. 1 in accordance with the present disclosure.
Figure 8:
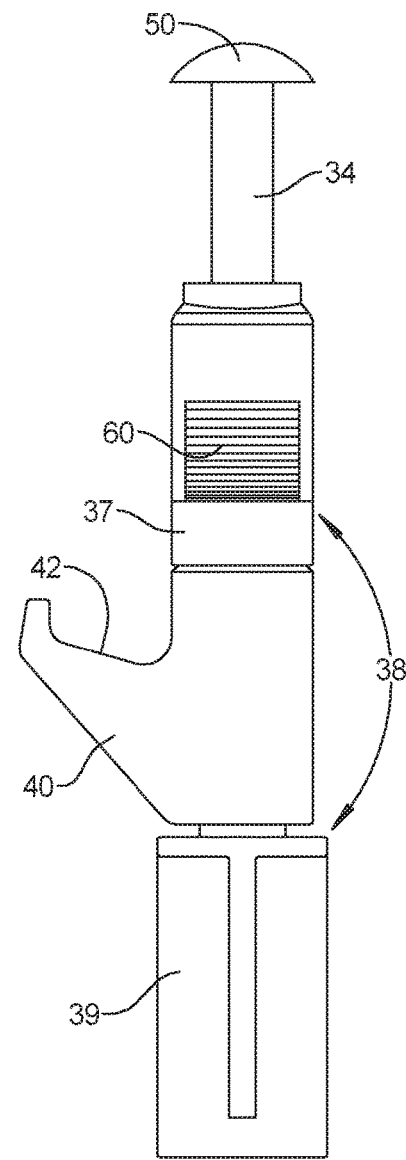
FIG. 8 is a side plan view of the ratchet clamp of FIG. 7.
Figure 9:
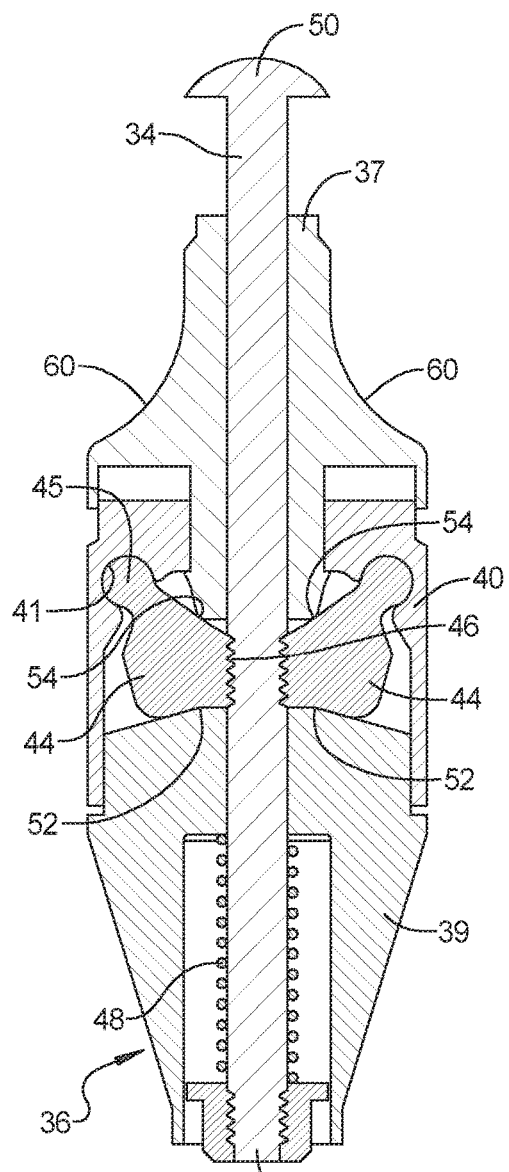
FIG. 9 is a cross-sectional view of various components of the ratchet clamp of FIG. 2 in a clamped position.
Figure 10:
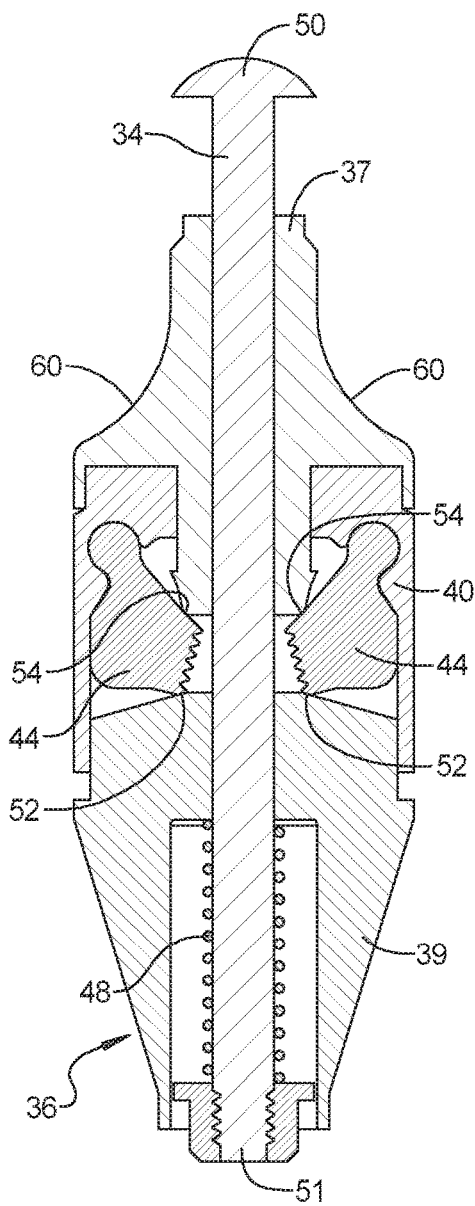
FIG. 10 is a cross-sectional view similar to FIG. 9 with the ratchet clamp of FIG. 2 in an unclamped position.
Figure 11:
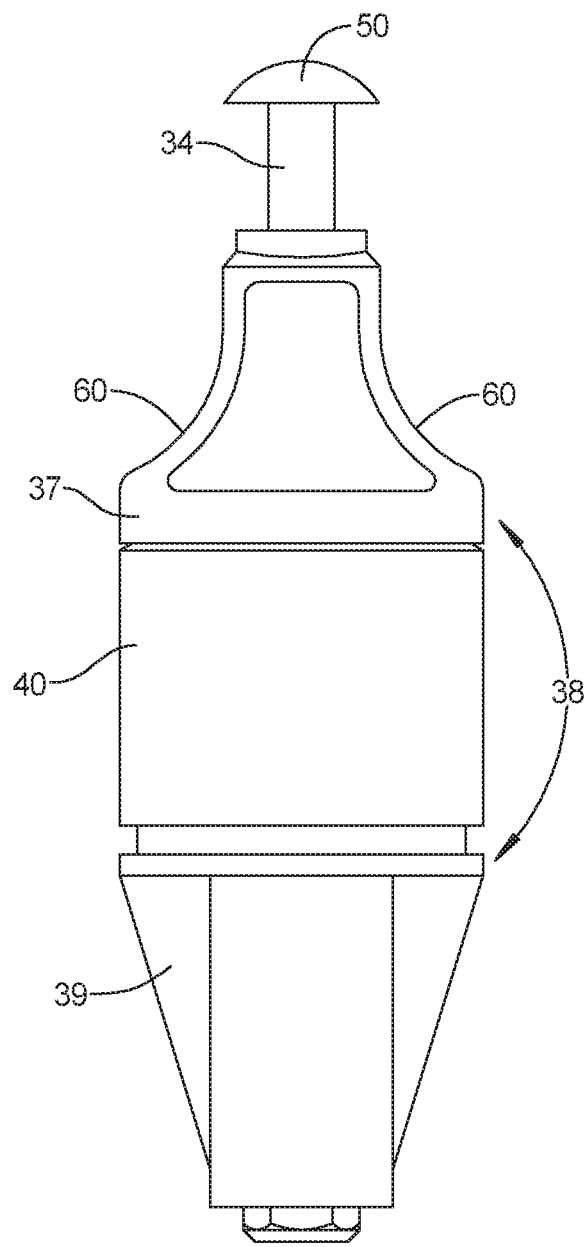
FIG. 11 is a front elevation view of the ratchet clamp of FIG. 7.

A locking mechanism 44 can be coupled to the housing 36. In some embodiments, the locking mechanism 44 can include one or more locking pawls 44 pivotably coupled to the second housing portion 40. For example, the locking pawls 44 can include bulbous portions 45 retained within semi-circular recesses 41 of the second housing portion 40. The locking mechanism or pawls 44 can move, such as by pivoting, between locked and unlocked positions corresponding to the locked and unlocked positions of the first and second housing portions, 38 and 40, respectively. FIG. 4 illustrates the clamp 26 of FIG. 2 in the unlocked position, and FIG. 5 illustrates this clamp 26 in the locked position. The locking mechanism and elongate member can comprise cooperating engagement members to provide locking engagement therebetween. Examples of cooperating locking engagement members can include teeth, notches, grooves, knurled surfaces, or combinations of these and many others.

When the locking mechanism 44 and housing 36 are in the unlocked position as seen, e.g., in FIG. 4, the locking mechanism 44 can be positioned away from the elongate member 34 to release the elongate member 34 and allow movement of the channel 42 relative to the elongate member 34. When the locking mechanism 44 and housing 36 are in the locked position as seen, e.g., in FIG. 5, the locking mechanism 44 can be positioned to engage the elongate member 34 to prevent movement of the channel 42 relative to the elongate member 34. In some embodiments, the elongate member can be a threaded rod 34, and the locking mechanism can be locking pawls 44 that can engage the threads 46 of the rod 34 in the locked position. Although the threads 46 can extend along all or substantially all of the length of the threaded rod 34, the threads 46 are shown in the drawings only where they are engaged by the locking pawls 44 in order to simplify the drawings. Alternative locking mechanisms 44 can be used instead of the cooperating locking pawl 44 and rod 34 threads 46.

The latch 26 can include a biasing member 48 to apply a biasing force to the housing 36 which biases the housing 36 toward the tonneau cover 10 or its sheet material 14, or toward the proximal end 50 of the elongate member 34. In some embodiments, the biasing member 48 can be mounted on the elongate member 34 between a threaded nut 58 and the housing 36 and can engage the first housing portion 38 of the housing 36. The first housing portion 38 of the housing 36 can include a first contact 52, which can be an internal protrusion or surface, positioned to engage against the locking pawls 44 to move the locking pawls 44 toward the elongate member 34 as the first and second housing portions, 38 and 40, respectively, move from the unlocked position toward the locked position. Thus, the first housing portion 38 of the housing 40 can transfer the biasing force to the locking mechanism 44 so the biasing force operates to bias both the locking mechanism 44 and the first and second housing portions, 38 and 40, respectively, toward their corresponding locked positions.

In some embodiments, the first housing portion 38 of the housing 36 can include a second contact 54, which can be an internal protrusion or surface, positioned to engage against the locking pawls 44 to move the locking pawls 44 away from the threaded rod 34 as the first and second housing portions, 38 and 40, respectively, move from the locked position toward the unlocked locked position. The second housing portion 40 can be positioned closer to the first housing portion 38 in the locked position than in the unlocked position. As in the exemplary embodiment illustrated in FIGS. 1-6, the first housing portion 38 can be an integral or one-piece component comprising both the first contact 52 and the second contact 54.

As in the exemplary embodiment illustrated in FIGS. 1-6, a second biasing member 56 can be positioned and engage between the first housing portion 38 and the second housing portion 40 to apply a biasing force to bias the housing 36 toward the unlocked position. Thus, the first housing portion 38 of the housing 40 can transfer the second biasing force to the locking pawls 44, via second contact 54 so the second biasing force of the second biasing member 56 operates to bias both the locking mechanism 44 and the first and second housing portions, 38 and 40, respectively, toward their corresponding unlocked positions.

The housing 36 can include a manual grasping feature 60 to facilitate manual movement of the housing 36 by a user away from the proximal end 50 of the rod 34 or the tonneau cover 10, and against the biasing force of the biasing member 48. The first housing portion 38 can comprise the manual grasping feature 60. As in the embodiment of FIGS. 1-6, the grasping feature 60 can be positioned on a distal end of the first housing portion 38 and the grasping feature 60 can comprise a handle shaped member.

To clamp the tonneau cover system 10 to the cargo box 11, a user manually engages the grasping feature 60 and pulls the first housing portion 38 away from the tonneau cover 10, downwardly, or toward the distal end 51 of the rod 34. During this operation, the second biasing member 56 tends to retain the housing portions, 40 and 38, and locking pawls 44 in their respective unlocked positions. Thus, the user can pivot the clamp 26 via coupling 32 so that the channel 42 is positioned under the flange 20 in preparation for latching.

In this position, as the user releases or reduces the downward manual force provided via the grasping feature 60, the biasing force of the biasing member 48 causes the housing 36 to move upward toward the downwardly disposed distal edge 22 of the flange 20. Simultaneously, the second biasing member 56 biases both the locking pawls 44 and the first and second housing portions, 38 and 40, respectively, toward their corresponding unlocked positions as previously described.

Upon contact between the downwardly disposed distal edge 22 and the channel 42, continued release of the downward manual force results in the biasing force of biasing member 48 driving both the locking pawls 44 and the first and second housing portions, 38 and 40, respectively, into their locked position. This is because the biasing force of biasing member 48 is greater than and sufficient to overcome the second biasing force of the second biasing member 56. As should be apparent, the only upwardly directed force the clamp 26 is capable of exerting upwardly against the downwardly disposed distal edge 22 is provided by the biasing member 48. Thus, the maximum force that the clamp 26 can exert during the clamping operation is limited to the biasing force that the biasing member can provide. Thus, the clamp 26 can help insure that the clamping force exerted on the flange 20 during the clamping operation is insufficient to permanently deform the flange.

When unlatching the clamp 26, a user again manually engages the grasping feature 60 and pulls the first housing portion 38 away from the tonneau cover 10, downwardly, or toward the distal end 51 of the rod 34. Initially, the second biasing member 56 provides a second biasing force that tends to move the housing portions, 38 and 40, toward their respective unlocked positions. Once the channel 42 can clear the downwardly disposed distal edge 22 of the flange 20, the user can pivot the clamp 26 via coupling 32 so that the channel 42 is positioned clear of the flange. In this position, continued release of the grasping force will continue to move the housing 36 upward, toward the proximal end 50 of the rod 34, or toward the tonneau cover material 14.

The distal end of the first housing portion 38 can also include a detent 62 to engage edges of the opening 30 of the rail 31 to retain the clamp 26 at least partially within the channel 28 when the clamp 26 is pivoted to such a retained recessed position in which the primary longitudinal axis 33 of the clamp 26 and the central longitudinal axis of the rail 31 can be substantially aligned or parallel. A cantilevered arm or spring member 64 can comprise the detent 62. In other words, the detent 62 can be positioned on a cantilevered arm or spring member 64.

FIGS. 7-11 illustrate a second exemplary embodiment of a ratchet clamp 26 that can be used alternatively or additionally in a tonneau cover system 10 for covering a truck bed or cargo box 11 in accordance with the present disclosure. As illustrated, the same reference numerals are used in FIGS. 7-11 as were used in FIGS. 2-6 to identify corresponding elements, even though the illustrated elements may have somewhat different shapes or functions. Accordingly, much of the discussion provided above with respect to the first exemplary embodiment will not be repeated here with respect to this second exemplary embodiment. Thus, the description below focuses on particular structural or functional differences, while other differences will be apparent from the drawings themselves.

In this exemplary embodiment, the first housing portion 38 comprises two separate components, 37 and 39. The second housing portion 40 can be positioned between the two separate housing components, 37 and 39, of the first housing portion 38. Like the first exemplary embodiment, the second housing portion 40 can move along the rod 34 relative to the first housing portion 38. The first component 39 of the first housing portion 38, however, can also be moved or slid along the length of elongate member 34 relative to the second component 37 of the first housing portion 38. For example, the first and second housing components, 39 and 37, respectively, can be grasped and pulled away from each other. Because the first contact 52 is integral with the first housing component 39 of the first housing portion 38 and the second contact 54 is integral with the second housing component 37, and these components are slidable along the rod 34 relative to each other, the first contact 52 and the second contact 54 are not part of an integral or one-piece component. Alternatively, they could be, e.g., by providing a connecting bridge member (not illustrated) between the first housing components, 39 and 37, extending along the rod 34 without interfering with engagement of the locking pawls 44 with the threads 46.

In this second embodiment, biasing member 48 engages and applies a biasing force to the first housing component 39 of the first housing portion 38. The first housing component 39 engages the locking pawls 44 to transfer the biasing force to the locking pawls 44 and bias the locking pawls 44 and the first housing component 39 and the second housing portion 40 toward their locked positions. In the locked position, the second housing portion 40 can be further from the first housing component 39 of the first housing portion 38 than in the unlocked position, and vice versa.

In addition, the biasing force of the biasing member 48 that is transferred to the pawls 44 can be further transferred via the pawls 44 to the second housing component 37 of the first housing portion 38. In this way, the entirety of the housing, including the first and second housing components, 39 and 37, respectively, of the first housing portion 38 and the second housing portion 40, along with the locking pawls 44, can all be biased toward the locked position by a single biasing member 48, despite the use of a two-component first housing portion 38.

The proximal end of the first housing portion 38 can be provided by the second housing component 37 thereof. The grasping feature 60 can be provided on the second housing component 37 and at the proximal end of the first housing portion 38. As with this second embodiment, the grasping feature 60 can comprise a reduced or expanded cross-sectional portion, a textured surface, or both, to provide finger perches that can be grasped between the fingers to facilitate manual movement of the housing, 38 and 40, away from the tonneau cover 10 and proximal end 50 of the threaded rod 34 and against the biasing force of the biasing member 48.

Using this second clamp embodiment to clamp the tonneau cover system 10 to the cargo box 11, a user manually engages the grasping feature 60 and pulls the first housing portion 38 away from the tonneau cover 10, downwardly, or toward the distal end 51 of the rod 34. During this operation, the manual force overcomes the biasing force of the biasing member 48. Specifically, the manual force is transferred from the second housing component 37 of the first housing portion 38 to the pawls via engagement between the contacts 54. The manual force is further transferred from the pawls 44 to the first component 39 of the first housing portion 38 where it can counteract the upward biasing force of the biasing member on the first component 39. In this way, the manual force causes the housing portions, 40 and 38, and locking pawls 44 to move into their respective unlocked positions and to space the channel 42 sufficiently away from the tonneau cover 10. In this configuration, the user can pivot the clamp 26 via coupling 32 so that the channel 42 is positioned under the flange 20 in preparation for latching.

In this position, as the user releases or reduces the downward manual force provided via the grasping feature 60, the biasing force of the biasing member 48 causes the housing 36 to move upward toward the downwardly disposed distal edge 22 of the flange 20. Simultaneously, the manual force continues to retain both the locking pawls 44 and the first and second housing portions, 38 and 40, respectively, toward their corresponding unlocked positions as described above.

Upon contact between the downwardly disposed distal edge 22 and the channel 42, continued release of the downward manual force results in the biasing force of biasing member 48 driving both the locking pawls 44 and the first and second housing portions, 38 and 40, respectively, into their locked position. As should be apparent, the only upwardly directed force the clamp 26 is capable of exerting upwardly against the downwardly disposed distal edge 22 is provided by the biasing member 48. Thus, the maximum force that the clamp 26 can exert during the clamping operation is limited to the biasing force that the biasing member can provide. Thus, the clamp 26 can help insure that the clamping force exerted on the flange 20 during the clamping operation is insufficient to permanently deform the flange.

When unlatching the clamp 26, a user again manually engages the grasping feature 60 and pulls the first housing portion 38 away from the tonneau cover 10, downwardly, or toward the distal end 51 of the rod 34. The manual downward force is again transferred from the second housing component 37 of the first housing portion 38 to the pawls 44, and from the pawls to the first housing component 39 of the first housing portion 38, to counteract and overcome the upward biasing force of the first biasing member 48. Thus, the manual force tends to move the housing portions, 38 and 40, and the locking pawls 44 toward their respective unlocked positions, and the entire housing 36 downward toward the distal end 51 of the rod 34.

Once the channel 42 can clear the downwardly disposed distal edge 22 of the flange 20, the user can pivot the clamp 26 via coupling 32 so that the channel 42 is positioned clear of the flange. In this position, continued release of the grasping force will continue to move the housing 36 upward, toward the proximal end 50 of the rod 34, or toward the tonneau cover material 14, and until the various portions and components of the housing 36 and the locking pawls again move into their respective locked positions under the influence of the biasing member 48 as discussed above.

Figure 14:
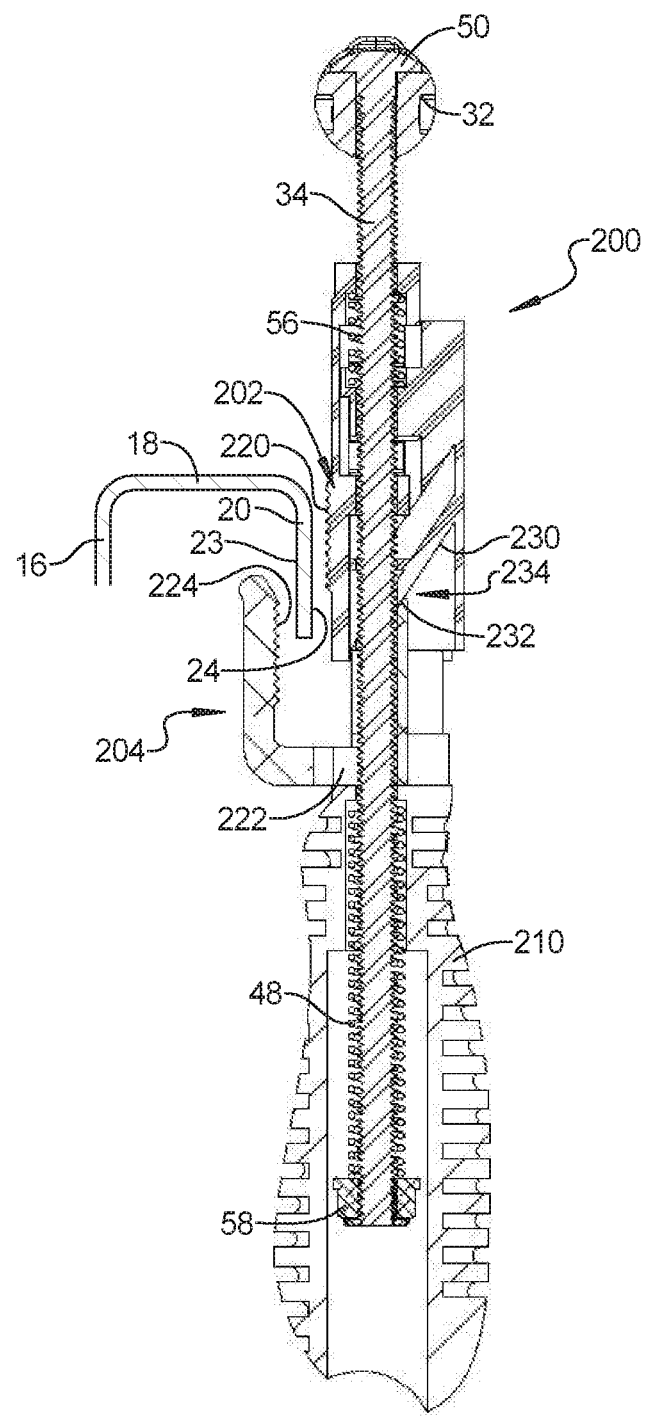
FIGS. 14 and 15 are cross-section views of the ratchet clamp of FIGS. 12 and 13 in an unlocked or unclamped position or state.
Figure 15:
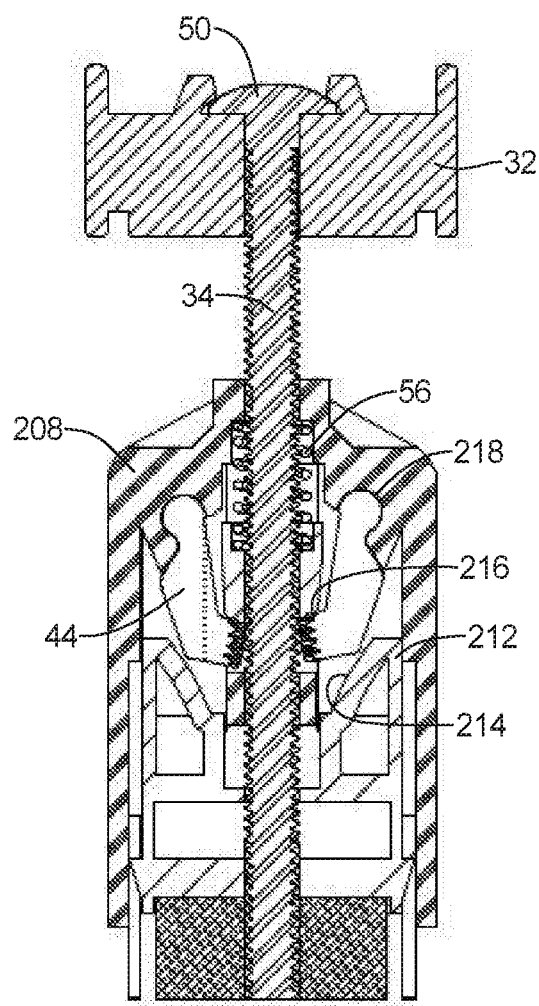
Figure 16:
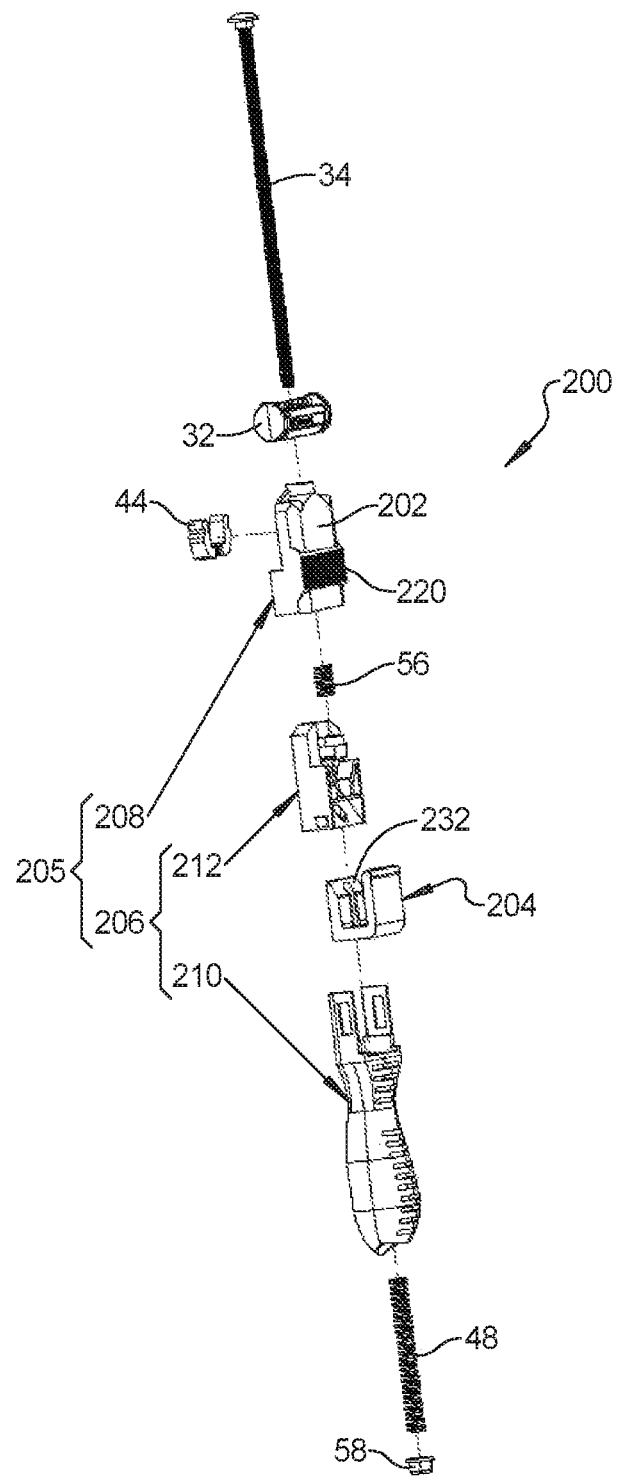
FIG. 16 is an exploded view of the ratchet clamp of FIGS. 12 and 13.

In the example embodiments of FIGS. 1-11, the second housing portion 40 of the ratchet clamp includes the channel 42 that engages and clamps against the distal edge 22 flange 20 of the cargo box 11. In an alternative embodiment, the ratchet clamp can include a first clamp member and a second member that moves relative to the first clamp member, such that in a locked state the first clamp member and the second clamp member can engage and apply a clamping force against opposing lateral sides or faces 23, 24 of the flange 20 disposed between the first clamp member and the second member. More particularly, with reference to FIGS. 12-16, a ratchet clamp 200 can include a first clamp member 202 and a second clamp member 204 that can be moveable with respect to the first clamp member 202 to place the ratchet clamp 200 in a clamped position (FIGS. 12 and 13) and an unclamped position (FIGS. 14 and 15). In the clamped position, the first clamp member 202 and the second clamp member 204 can engage and apply a clamping force therebetween. In the unclamped position, an enlarged gap is provided between first clamp member 202 and the second clamp member 204.

Similar to the ratchet clamp 26, the ratchet clamp 200 can also include the barrel member 32, the rod 34, the locking mechanism 44, the first biasing member 48, and the second biasing member 56. The ratchet clamp 200 can also include a housing 205 that comprises a first housing portion 206 and a second housing portion 208 slidably coupled to the elongate member 34. Similar to the first and second housing portions 38 and 40, the first and second housing portions 206 and 208 can move relative to each other between a locked or clamped position (FIGS. 12 and 13) and an unlocked or unclamped position (FIGS. 14 and 15).

The first housing portion 206 can include an elongated handle or a handle member 210 and a lock interface member 212. The handle member 210 can include a grasp feature 214 that can be manually operated by the user to lock and unlock the ratchet clamp 200, as described herein. The second clamp member 204 can be positioned between the handle member 210 and the lock interface member 212, and can be positioned to abut with a surface of the handle member 210.

The lock interface member 212 can include a first contact 214 and a second contact 216, which are similar to the first contact 52 and the second contact 54, respectfully. For example, the first contact 214 can engage against the locking mechanism 44 and move the locking mechanism 44 toward the rod 34 as the housing moves from the unlocked position toward the locked position. The second contact 216 can engage against the locking mechanism 44 to move the locking mechanism 44 away from the rod 34 as the housing 205 moves from the locked position toward the unlocked locked position.

The locking mechanism 44 can be coupled to the housing 205. For example, the locking mechanism can be positioned between the lock interface member 212 and the second housing portion 208, and can be retained within semi-circular recesses 218 defined by the second housing portion 208.

The first biasing member 48 can be between the threaded nut 58 and the handle member 210 of the first housing portion 206. The first biasing member 48 can engage and apply a biasing force to the housing 205 in order to bias the housing 205 toward the tonneau cover 10 or, in other words, toward the proximal end 50 of the rod 34. The second biasing member 56 can be positioned and engage between the first housing portion 206 and the second housing portion 208 to apply a second biasing force to bias the housing 205 toward the unlocked position. The first housing portion 206 of the housing 205 can transfer the second biasing force to the locking mechanism 44 via the second contact 216, so the second biasing force of the second biasing member 56 operates to bias both the locking mechanism 44 and the first and second housing portions 206 and 208 toward their corresponding unlocked positions.

The first clamp member 202 can be integrated with the second housing portion 208, and can include a first clamping surface 220 that can extend generally parallel to the longitudinal or central axis 33 of the rod 34. The first clamping surface 220 can be disposed to engage an inboard side of the flange 20. Alternatively, the first clamp member 202 can be separate from the second housing portion 208.

The second clamp member 204 can be mounted on the rod 34 via an aperture 222 such that the second clamp member 54 can be slidably coupled to the rod 34. The second clamp member 204 can include a second clamping surface 224 that can extend substantially parallel to the first clamping surface 220.

A ramp mechanism 234 can include at least one ramp surface 230, 232 between the first and second clamp members 202 and 204 to cause lateral translation of the second clamping surface 224 relative to the first clamping surface 220 in response to the housing 205 moving between the unlocked position and the locked position. Specifically, the ramp mechanism 234 can include a first ramp surface 230 and a second ramp surface 232. The first ramp surface 230 can be formed as part of the lock interface member 212 of the first housing portion 206, and the second ramp surface 232 can be formed as part of the second clamp member 204. The first ramp surface 230 can extend at an acute angle relative to the axis 33 of the rod 34. The second ramp surface 232 can extend at a complementary angle to the acute angle of the first ramp surface 230, and can be disposed to engage against the first ramp surface 230. Additional discussion regarding the ramped surfaces 230, 232, their operation, and the resulting clamping action can be found in U.S. Pat. No. 9,533,555 issued on Jan. 3, 2017, the entirety of which is incorporated herein by reference.

Figure 12:
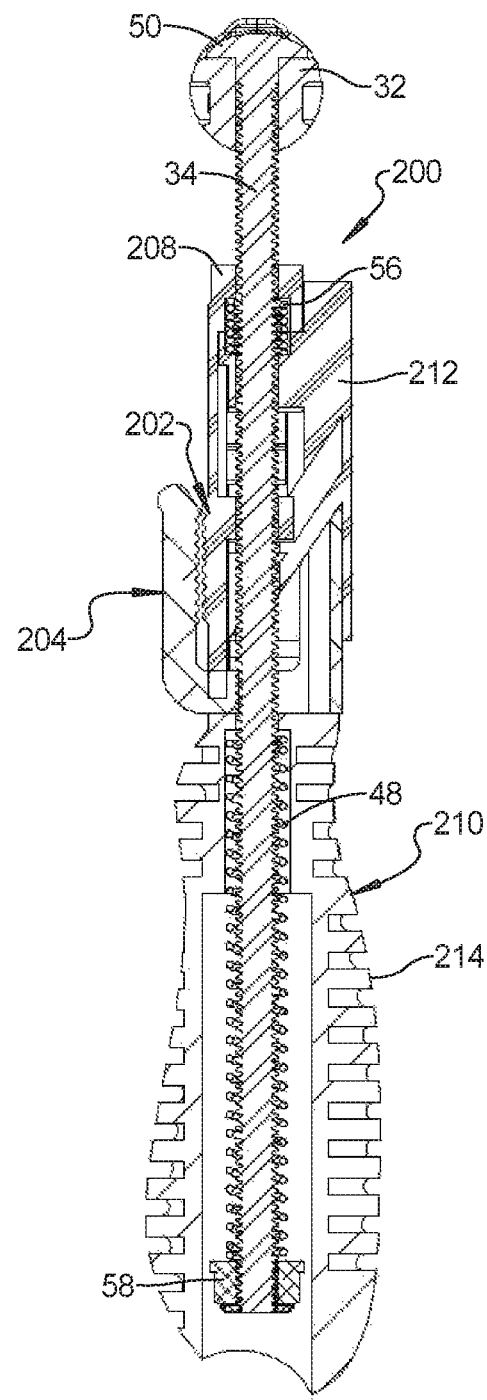
FIGS. 12 and 13 are cross-sectional views of another exemplary embodiment of a ratchet clamp for the tonneau cover system of FIG. 1 in accordance with the present disclosure, in a locked or clamped position or state.
Figure 13:
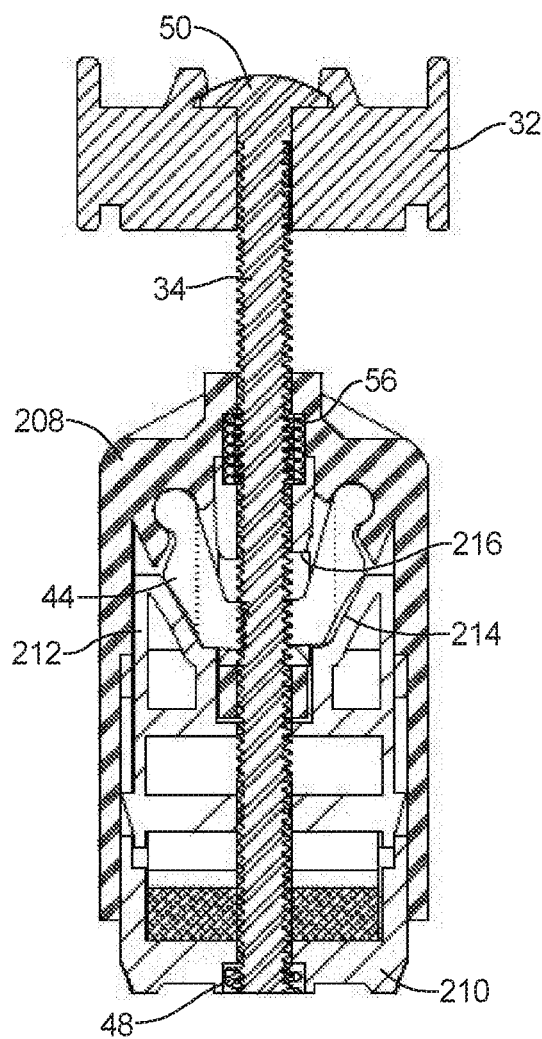

In moving from the unclamped position illustrated in FIG. 15 to the clamped position illustrated in FIGS. 12 and 13, the second ramp surface 232 of the second clamp member 204 moves along the first ramp surface 230 of the first clamp member 202, causing translation of the second clamp member 204 relative to and toward the first clamp member 202 and in a direction that is perpendicular to the axis A of the rod 34. Thus, the second clamp member 204 has moved relative to the first clamp member 202 in both an axial direction and a direction perpendicular thereto from FIG. 14 to FIG. 12. In other words, the second clamp member 204 has undergone both axial and lateral or perpendicular translation or movement relative to the axis 33 of the rod 34, or relative to the first clamp member 202.

In the clamped position, the first clamping surface 220 of the first clamp member 202 engages the inboard side 24 of the flange 20, and the second clamping surface 224 of the second clamp member 204 engages the outboard side 22 of the flange 20 to apply a compressive clamping force to the flange 20. As illustrated, both the first and second clamping surfaces, 220 and 224, directly engage against the opposing sides or faces, 23 and 24, respectively, of the flange 20. In other embodiments, one or both of the first and second clamping surfaces 220 and 224 may indirectly engage the opposing sides or faces, 23 and 24, respectively, of the flange 20. For example, another component of the tonneau cover system 10, such as a plastic cover material, might overlay one or both sides of the flange 20.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a downwardly extending flange with a downwardly disposed edge, the tonneau cover system comprising:
   a tonneau cover for covering the cargo box; and
   a clamp to secure the tonneau cover to the cargo box, the clamp comprising:
   an elongate member having a proximal end pivotably coupled to the tonneau cover;
   a first clamp member having a first clamping surface;
   a second clamp member slidably coupled to the elongate member and having a second clamping surface, the second clamp member being slidable along the elongate member relative to the first clamp member between a locked position and an unlocked position;
   a ramp mechanism including at least one ramp surface between the first and second clamp members shaped to cause lateral translation of the second clamping surface relative to the first clamping surface in response to the first and the second clamp members moving between the unlocked position and the locked position;
   a locking mechanism coupled to the first clamp member, wherein the locking mechanism is movable to engage the elongate member to prevent lateral translation of the second clamping surface relative to the first clamping surface in response to the first and the second clamp members being in the locked position, and the locking mechanism is movable to release the elongate member to allow lateral translation of the second clamping surface relative to the first clamping surface in response to the first and the second clamp members being in the unlocked position; and
   a biasing member applying a biasing force biasing the first clamp member and the second clamp member toward the proximal end of the elongate member.

2. The tonneau cover system according to claim 1, wherein the second clamping surface and the first clamping surface are in a clamped position when the first and the second clamp members are in the locked position.

3. The tonneau cover system according to claim 2, wherein, in the clamped position, the first clamping surface is in opposed relationship to the second clamping surface to apply a clamping force therebetween.

4. The tonneau cover system according to claim 1, wherein the second clamping surface moves toward the first clamping surface by way of the ramp mechanism as the first and the second clamp members are placed in the locked position and the second clamping surface moves away from the first clamping surface by way of the ramp mechanism as the first and the second clamp members are placed in the unlocked position.

5. The tonneau cover system according to claim 1, further comprising a second biasing member between the first and the second clamp members and biasing the first and the second clamp members toward the unlocked position.

6. The tonneau cover system according to claim 1, wherein the second clamp member includes a first housing that includes a first contact and a second contact, the first contact is positioned to engage against the locking mechanism and move the locking mechanism toward the elongate member as the first and the second clamp members move from the unlocked position toward the locked position, and the second contact is positioned to engage against the locking mechanism and move the locking mechanism away from the elongate member as the first and the second clamp members move from the locked position toward the unlocked position.

7. The tonneau cover system according to claim 1, wherein the first clamp member includes a housing, and the locking mechanism is pivotably coupled to the housing.

8. The tonneau cover system according to claim 1, wherein the elongate member comprises a rod defining an axis, wherein the locking mechanism is movable to engage the elongate member to prevent axial movement along the axis of the first and second clamp members in response to the first and the second clamp members being in the locked position.

9. The tonneau cover system according to claim 1, wherein the elongate member comprises a rod defining an axis, and wherein a first of the at least one ramp surface extends at an acute angle relative to the axis and is integral with the first clamp member.

10. The tonneau cover system according to claim 9, wherein a second of the at least one ramp surface extends at a complementary angle to the acute angle and is integral with the second clamp member.

11. The tonneau cover system according to claim 1, wherein the second clamping surface and the first clamping surface are in a clamped position when the first and the second clamp members are in the locked position, and wherein the elongate member comprises a rod defining an axis, and both clamping surfaces extend substantially parallel to the axis of the rod when in the clamped position.

12. The tonneau cover system according to claim 1, wherein both the first clamp member and the second clamp member are mounted on the elongate member.

13. The tonneau cover system according to claim 1, wherein the proximal end of the elongate member is pivotably coupled to the tonneau cover via a barrel member designed to slide along a channel of a tonneau cover rail member.

14. The tonneau cover system according to claim 1, wherein the elongate member is a threaded rod, and the locking mechanism comprised teeth that engage the threaded rod in the locked position.

15. The tonneau cover system according to claim 1, wherein the locking mechanism is pivotably coupled to the first clamp member.

16. The tonneau cover system according to claim 1, wherein the elongate member comprises a threaded rod, and the biasing member is positioned between a nut threaded on an opposing end of the elongate member and the second clamp member.

17. The tonneau cover system according to claim 1, wherein the locking mechanism comprises a pair of locking pawls.

18. The tonneau cover system according to claim 17, wherein each of the locking pawls are coupled to the first housing member and pivotable to engage the elongate member in the locked position, and pivotable to release the elongate member in the unlocked position.

* * * * *